United States Patent

Kono et al.

Patent Number: 5,814,956
Date of Patent: Sep. 29, 1998

[54] METHOD AND APPARATUS FOR CONTROL IN POWER FAILURE

[75] Inventors: Shinichi Kono; Junichi Tezuka, both of Yamanashi, Japan

[73] Assignee: Fanuc Ltd., Yamanashi, Japan

[21] Appl. No.: 898,643

[22] Filed: Jul. 22, 1997

Related U.S. Application Data

[63] Continuation of Ser. No. 502,877, Jul. 17, 1995, abandoned.

[30] Foreign Application Priority Data

Aug. 8, 1994 [JP] Japan ................................. 6-185716

[51] Int. Cl.$^6$ ................................. H02P 3/12; H02P 5/46
[52] U.S. Cl. ............................ 318/380; 318/68; 318/77; 318/85
[58] Field of Search ..................... 318/375, 380, 318/66–85, 376, 560–563, 569–571, 595, 599–605, 625, 37–43, 52, 67, 77, 86–89, 105–109; 364/474.01, 474.02, 474.06, 474.07, 474.15, 474.19, 474.32; 407/20–29; 408/22–26; 409/8–24

[56] References Cited

U.S. PATENT DOCUMENTS

| | | | |
|---|---|---|---|
| 3,991,352 | 11/1976 | Fry et al. ............................. | 318/759 |
| 4,423,363 | 12/1983 | Clark et al. .......................... | 318/375 |
| 4,446,408 | 5/1984 | Ebermann et al. .................... | 318/600 |
| 4,545,464 | 10/1985 | Nomura ............................... | 187/296 |
| 4,555,652 | 11/1985 | Brulard .............................. | 318/375 |
| 4,672,177 | 6/1987 | Makinen et al. ..................... | 318/380 |
| 5,113,123 | 5/1992 | Noser et al. ........................ | 318/106 |
| 5,228,814 | 7/1993 | Suwijn ............................... | 409/12 |
| 5,241,255 | 8/1993 | Oshima et al. ...................... | 318/801 |
| 5,291,106 | 3/1994 | Murty et al. ........................ | 318/375 |
| 5,304,900 | 4/1994 | Hayazaki et al. .................... | 318/34 |
| 5,473,238 | 12/1995 | Latham, II et al. .................. | 318/560 |

*Primary Examiner*—Brian Sircus
*Attorney, Agent, or Firm*—Staas & Halsey

[57] ABSTRACT

A method and apparatus for controlling a machine in a power failure. The present invention is applicable to such machines that a tool and a workpiece must always be controlled in synchronization with each other, and allows the tool and workpiece to stop without any damage in the power failure situation. If a power failure occurs during a synchronous cutting operation, the present invention disables a power regeneration function, connects a discharge resistor unit to a DC link of a power regeneration circuit, decelerates motors for tool drive and workpiece drive in synchronization with each other, and retracts the tool back to a safe area by driving a motor for tool feed with the power regenerated from the other two motors.

10 Claims, 5 Drawing Sheets

METHOD AND APPARATUS FOR CONTROL IN POWER FAILURE

This application is a continuation of application Ser. No. 08/502,877, filed Jul. 17, 1995, now abandoned.

BACKGROUND OF THE INVENTION

1. Field of the Invention

The present invention relates to a method and apparatus for control in power failure, and more specifically, to a method and apparatus for control in power failure, applicable to machines such as gear cutting machines including hobbing machines and gear grinding machines, wherein a motion of a workpiece and that of a tool must be always synchronized.

2. Description of the Related Art

NC machine tools shape a workpiece as desired by numerically controlling a relative motion of a workpiece and tool. Some machines require the workpiece and tool to move or rotate in synchronization with each other during the machining operations. A hobbing machine for gear cutting is a typical example of such machines.

FIG. 5 is a perspective view showing a concept of hobbing. The reference numerals 1 and 2 indicate a workpiece and a tool for cutting the workpiece, respectively. A servo motor rotates the workpiece 1 and the rotation speed is thus regulated. A spindle motor rotates the tool 2 and its rotation speed is controlled so that it is synchronized with the rotation of the workpiece 1. The tool 2 is also controlled by a servo motor for tool feed, whereby it can approach the workpiece 1 and retract therefrom.

The tool 2 is a gear cutting tool called "hob," which has a thread and several flutes (cutter flutes) across the thread, thus obtaining many cutting edges along the thread trace. The tool 2 is located so that the trace of its cutting edges coincides with the tooth trace of the workpiece 1 being subjected to cutting. By rotating the tool 2, the cutting edges cut into the workpiece 1 one after another. Since the cutting edges are distributed along the thread and the tool 2 is rotating, the points of engagement move forward in the axial direction. Therefore, by rotating the workpiece 1 in synchronization with that linear movement of the engagement points, the teeth are gradually shaped on the workpiece 1 from the addendum to the bottom. In this way, the gear cutting operation is achieved by the tool's rotation synchronized with the workpiece's rotation. After completion of the gear cutting, the tool 2 retracts from the location of engagement with the workpiece 1, driven by the servo motor for tool feed.

The above-described numerically controlled hobbing machine is one of the machines that operates with a tool and a workpiece synchronized at all times. However, in case that a power failure has happened in the middle of the cutting process, those machines will encounter a serious problem. Both the spindle motor rotating the tool and the servo motor rotating the workpiece will be decelerated and stopped due to the loss of electric power to the amplifiers which are driving the motors. Unlike their well-controlled motions in the normal conditions, two motors will stop by themselves independently in case of a power failure, being free from the NC control. It simply means that the behaviors of the tool and workpiece are completely asynchronous until they stop.

As such, the conventional control has no means to maintain the synchronous operation in case of the power failure. It could cause a serious damage of the workpiece or tool since the cutting edges would engage too deeply with the workpiece.

SUMMARY OF THE INVENTION

Taking the above into consideration, an object of the present invention is to provide a control method whereby a workpiece and a tool can stop without damage in a power failure, thus being applicable to the machines wherein the motions of the workpiece and the tool must always be synchronized.

To accomplish the above object, according to the present invention, there is provided a method for controlling, in a power failure, a machine wherein a tool and a workpiece are numerically controlled in synchronization with each other, comprising the following four steps of operations.

The method firstly disables a power regeneration function in response to a detected power failure, thereby inhibiting a regenerative power to return to an AC power line. The power regeneration function resides in a power regeneration circuit which supplies electric power to amplifiers to drive a motor for tool drive, a motor for workpiece drive and a motor for tool feed.

The method secondly makes a discharge resistor unit ready to be connected to a DC link which interconnects the power regeneration circuit and the amplifiers.

The method thirdly issues a deceleration command to decelerate the motor for tool drive and the motor for workpiece drive in synchronization with each other. The deceleration command is created by a numerical controller whose power supply is backed up by an uninterruptible power supply system.

The method lastly retracts the tool to a safe area where the tool does not engage with the workpiece any more. In this step, the motor for tool feed is driven with the regenerative power produced in the deceleration of the motor for tool drive and the motor for workpiece drive.

According to the above method, upon detection of the power failure, the motors for tool drive and workpiece drive are synchronously decelerated by the numerical controller and the tool is simultaneously retracted to a safe area.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below with reference to the drawings.

Figure 1:
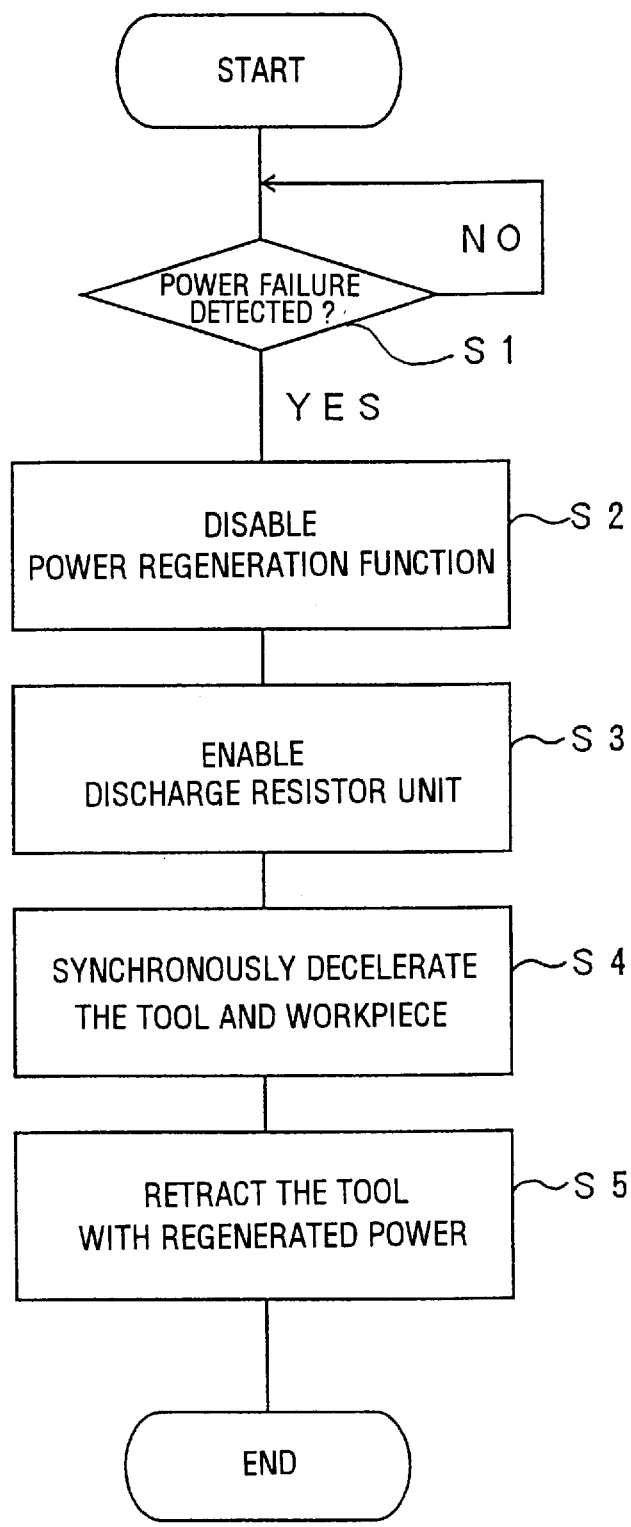
FIG. 1 is a flow chart showing a control method in power failure of the present invention.

FIG. 1 is a flow chart showing a control method in power failure of the present invention. FIG. 1 shows that the control method of this embodiment comprises five steps of operations.

First, an AC power line is monitored to detect a power failure during a cutting process in a machine wherein a workpiece and a tool are numerically controlled to be always in synchronization with each other (Step S1).

Secondly, when the power failure is detected in Step S1, a power regeneration function is disabled (Step S2). The power regeneration function is a function to return energy regenerated from the decelerating motors to the AC power line. This function is provided in a power regeneration circuit which usually supplies electric power to amplifiers to energize three motors for tool drive, workpiece drive and tool feed. By disabling the function in this step, the regenerative power will not return to the AC power line.

Thirdly, a discharge resistor unit becomes ready to be connected to a DC link (Step S3). The DC link is a DC power interconnection line which supplies power to the amplifiers or carries the regenerative power from the amplifiers. By this step, the discharge resistor unit becomes operable and, when the regenerative power has exceeded a predetermined threshold, the unit will discharge the excessive power.

Fourthly, the numerical controller issues a command to decelerate the motors for tool drive and workpiece drive keeping synchronization with each other (Step S4). Here, the numerical controller is backed up by a UPS (Uninterruptible Power Supply) system to ensure its control operation in power failure.

Lastly, the decelerating motors regenerate electric power and this regenerative power is reused as a power source for the motor for tool feed. The tool thus retracts to an area where it will not engage with the workpiece any more (Step S5).

Figure 2:
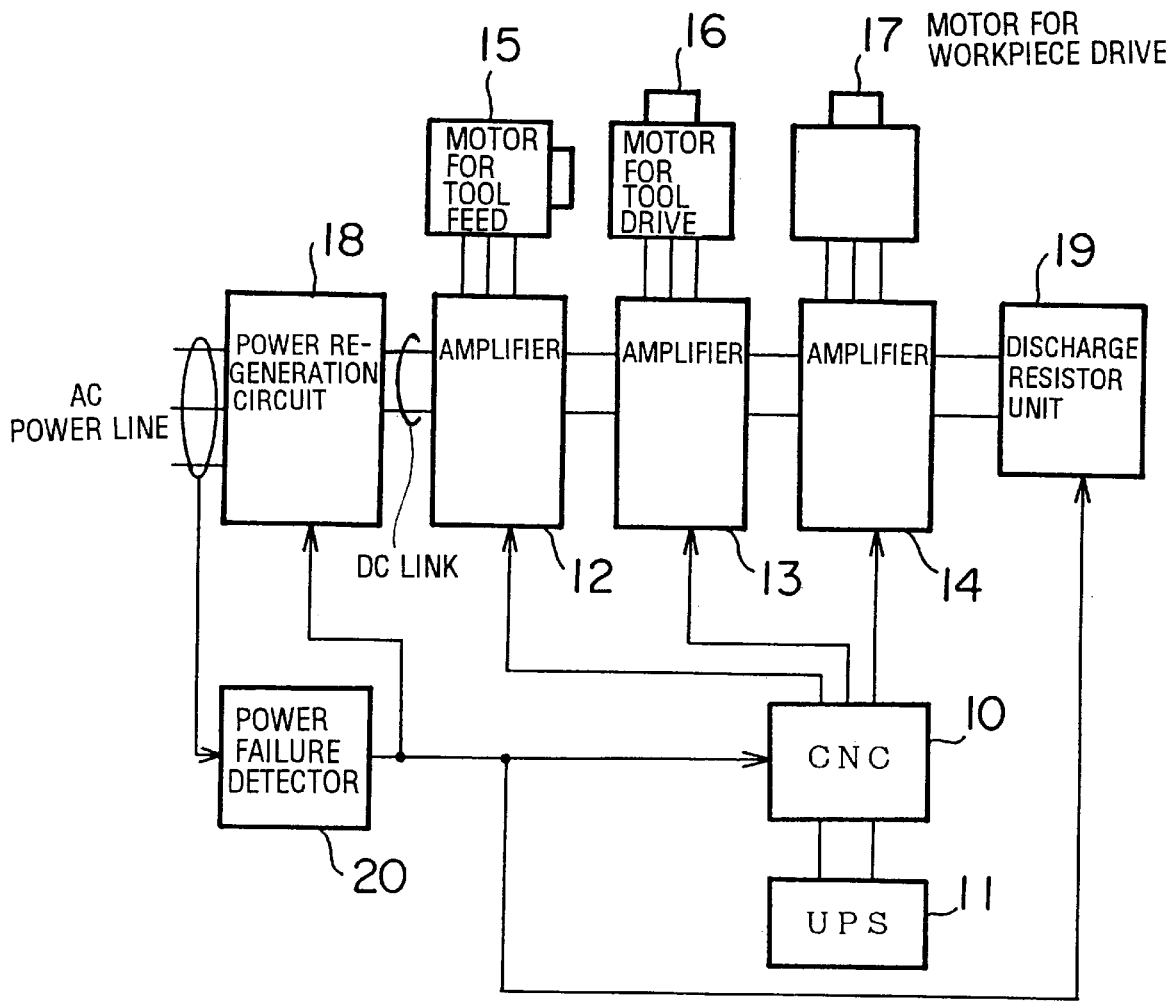
FIG. 2 is a block diagram showing a specific arrangement of a control apparatus in power failure of the present invention.

FIG. 2 is a block diagram showing a specific arrangement of apparatus for control in a power failure according to the present invention. A CNC 10 in FIG. 2 is a computerized numerical controller, which controls a gear cutting machine, such as a hobbing machine. The power source for the CNC 10 is backed up by an uninterruptible power supply (UPS) 11. Control commands from the CNC 10 are connected to amplifiers 12, 13 and 14, and power outputs from the amplifiers 12, 13 and 14 are supplied to a motor for tool feed 15, a motor for tool drive 16 and a motor for workpiece drive 17, respectively.

A commercial three-phase AC power line is connected to AC side terminals of a power regeneration circuit 18, and a DC link containing a capacitor (not shown in FIG. 2) is connected to DC side terminals thereof. The DC link is a DC power interconnection line which connects the amplifiers 12 through 14 and a discharge resistor unit 19 all in parallel. Also provided is a power failure detector 20, whose input is connected to the AC power line and the output (i.e., a power failure signal) is wired to each control input of the power regeneration circuit 18, the CNC 10, and the discharge resistor unit 19.

While the AC power line is in a normal condition and the numerically controlled gear cutting machine is properly operating, the CNC 10 controls the motor for tool drive 16 and the motor for workpiece drive 17 to be always in synchronization with each other. The motor for tool feed 15 is also controlled so as to feed the tool forward to the workpiece in the beginning of the gear cutting process and to move the tool backward in the end of the process.

In the normal operations, the amplifiers 12 through 14, being supplied with a power from the power regeneration circuit 18, drive the motors 15 through 17. When those motors decelerate, the rotation energy comes out therefrom which is well known as the regenerative energy. The energy will be converted to a DC power in the amplifiers and supplied to the DC link. Some of the DC power returns to the AC power line by being converted to AC by the power regeneration circuit 18. This function is called here a "power regeneration function," wherein the amplifiers act as converters (i.e., converting an AC power to a DC power) and the power regeneration circuit 18 acts as an inverter (i.e., converting a DC power to an AC power).

If a power failure occurs during the gear cutting process, the power failure detector 20 detects it and sends the power failure signal. Upon reception of the power failure signal, the power regeneration circuit 18 disables the above-described power regeneration function (or the inverter function) to prevent the regenerative power from flowing away to the AC power line.

Further, the discharge resistor unit 19 becomes ready to operate in response to the power failure signal, and the regenerative power, if excessively produced, will be discharged at the resistor.

The CNC 10, in response to the power failure signal, commands the amplifier 13 for motor (for tool drive 16) and the amplifier 14 (for the motor for workpiece drive 17) to decelerate and stop in synchronization with each other. The CNC 10 also commands the amplifier 12 for the motor for tool feed 15 to retract the tool back to a safe area.

The motor for tool drive 16 and the motor for workpiece drive 17, which are thus decelerating, regenerate the electric power. The power is fed back to the DC link by the amplifiers 13 and 14 which are now working as a converter. The regenerated power on the DC link will be reused as a power source for driving the motor for tool feed 15 to retract the tool back from the engagement with the workpiece.

Figure 3:
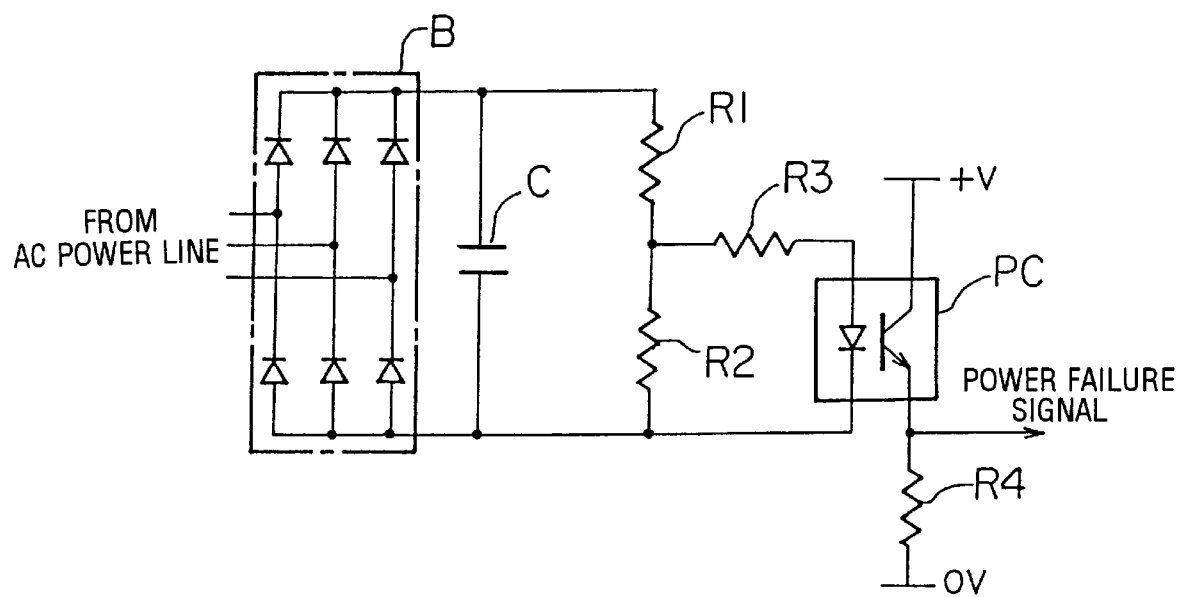
FIG. 3 is a schematic diagram showing a specific embodiment of a power failure detector.

FIG. 3 is a schematic diagram showing a specific embodiment of the power failure detector. The power failure detector 20 has a three-phase bridge rectifier B, which receives the AC power line voltage. The output of the bridge rectifier B is wired to a smoothing capacitor C and a voltage divider composed of resistors R1 and R2. Another resistor R3 is connected to the voltage divider and limits a current to flow through an LED (Light Emitting Diode) contained in a photocoupler PC. A positive DC voltage V+ is supplied to the collector of a phototransistor in the photocoupler PC, and the emitter is connected to a resistor R4, another end of which is connected to the ground 0 volt. The power failure signal is obtained at the emitter.

When the AC power is available, a current passes through the LED of the photocoupler PC. So the phototransistor is turned on and the power failure signal is thus driven nearly to the supply voltage V+.

On the other hand, when the AC power is lost, the current passing through the LED will stop. Then the phototransistor will be turned off and the resistor R4 will drive the power failure signal nearly to 0 volt.

Figure 4:
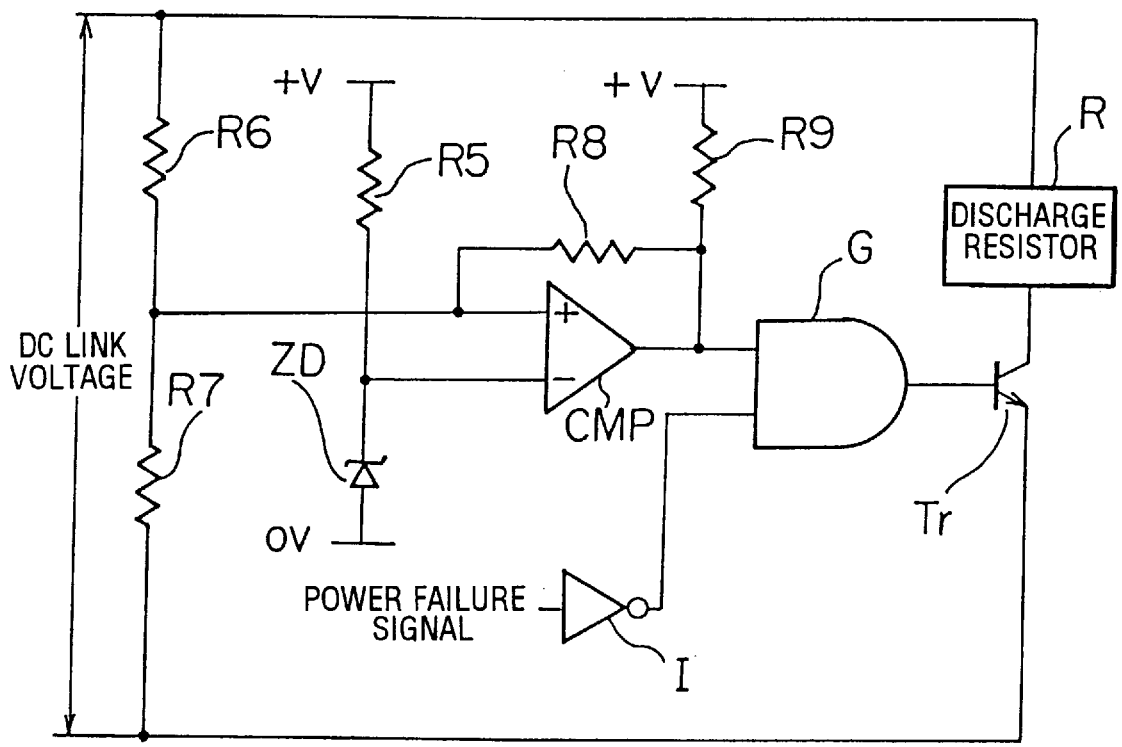
FIG. 4 is a schematic diagram showing a specific embodiment of a discharge resistor unit.
Figure 5:
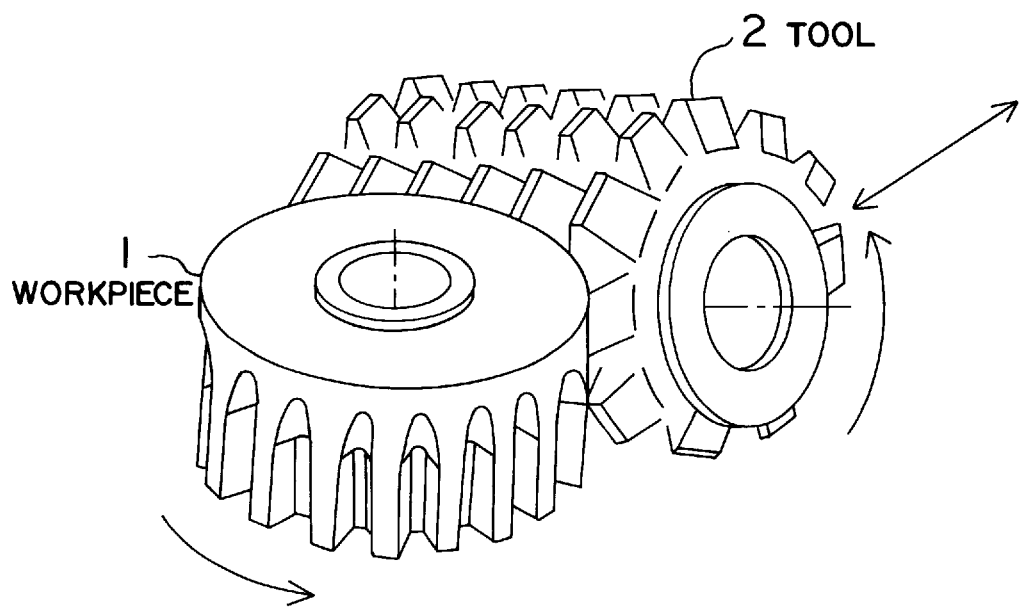
FIG. 5 is a perspective view showing a concept of hobbing.

FIG. 4 is a schematic diagram showing a specific embodiment of the discharge resistor unit. The discharge resistor unit 19 comprises a comparator CMP, whose inverting input is wired to a reference voltage source constructed by a resistor R5 and a zener diode ZD. The non-inverting input of the comparator CMP is connected to a junction of two resistors R6 and R7, which constructs a voltage divider to divide the terminal voltage of the DC link. A resistor R8, located between the comparator's output and non-inverting input, provides the comparator with a hysteresis in its threshold characteristics. A pullup resistor R9 pulls the output up to the supply voltage V+. The output of the comparator CMP is fed to one of the inputs of an AND gate G. Another input of the AND gate G is given from an inverter logic I which inverts the power failure signal. The AND gate G drives the base of a power transistor Tr, whose collector is connected to the discharge resistor R. The DC link voltage is applied between another terminal of the discharge resistor R and the emitter of the power transistor Tr.

In the normal condition, the input of the inverter logic I (i.e., the power failure signal) is High, so one of the AND gate inputs is driven to Low. Therefore, the output of the AND gate G is always Low, thus keeping the power transistor Tr turned off.

When a power failure has happened, the power failure signal changes from High to Low and the AND gate input changes from Low to High. Now the output of the comparator CMP decides the output of the AND gate, and the power transistor Tr is thereby controlled.

If the DC link voltage is higher than the threshold voltage defined by the reference voltage source and the voltage divider (R6 and R7), the comparator output becomes High. Then the power transistor Tr is turned on and the electric power on the DC link will be consumed by the discharge resistor R. That is, the discharge resistor R serves as a load of the motors that is now regenerating the electric power, whereby the motors are decelerated, as well known as the dynamic braking.

When the DC link voltage drops below the threshold due to the above-described discharge operation, the comparator output becomes Low and turns off the power transistor Tr, thus stopping further discharge of the power.

Because the discharge is stopped, the DC link voltage recovers. When it then exceeds the threshold, the discharge begins again.

By this means, the DC link voltage is regulated not to exceed and not to drop below the predetermined threshold voltage. The DC link voltage, regulated in this way, assures a successful retract operation of the motor for tool feed 15.

As described above, according to the present invention, when a power failure has happened during a synchronous operation, the motors for tool drive and workpiece drive are decelerated in synchronization with each other. And the motor for tool feed is controlled to retract the tool to a safe area, being driven with the regenerative power produced in the deceleration of the other two motors.

Therefore, in the machines wherein a workpiece and a tool must be numerically controlled in synchronization with each other, it becomes possible to avoid any damage of the tool or workpiece in the power failure.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method for controlling a machine tool and a workpiece to be machined by the machine tool, which are numerically controlled in synchronization during a power failure, comprising the steps of:

connecting an AC power line to a power regeneration circuit;

supplying power from said power regeneration circuit to a plurality of amplifiers to drive a tool drive motor, a workpiece drive motor and a tool feed motor;

regenerating rotation energy from said motors to DC power;

converting the regenerated DC power to AC power and returning the AC power to said AC power line;

detecting a power failure of said AC power line;

inhibiting the regenerated DC power from returning to said AC power line;

selectively connecting a discharge resistor unit to a DC link which interconnects the power regeneration circuit and the plurality of amplifiers in response to said detected power failure and when the regenerated DC sower exceeds a predetermined threshold;

decelerating the tool drive motor and the workpiece drive motor in synchronization; and retracting the tool by driving the tool feed motor with the regenerative power produced in the deceleration of the tool drive motor and the workpiece drive motor via said DC link.

2. An apparatus for numerically controlling a machine tool and a workpiece to be machined by the machine tool in synchronization during a power failure, comprising:

a plurality of amplifiers each to respectively drive a tool drive motor, a workpiece drive motor, and a tool feed motor;

power failure detecting means for detecting failure of an AC power line and outputting a power failure signal;

a numerical controller to control said plurality of amplifiers to decelerate the tool drive motor and the workpiece drive motor in synchronization and to drive the tool feed motor to retract the tool in response to the power failure signal;

a power regeneration circuit, connected to said AC power line and to said plurality of amplifiers, to convert AC power to DC voltage, to invert and return regenerative power produced in said deceleration of the tool drive motor and the workpiece drive motor to the AC power line, and to inhibit the inverting and returning of the regenerative power to the AC power line upon reception of the power failure signal; and a discharge resistor unit, connected to a DC link which interconnects the power regeneration circuit and the plurality of amplifiers, to selectively discharge the regenerative power on the DC link when the regenerative power has exceeded a predetermined threshold and the power failure signal is received.

3. The apparatus for control in power failure according to claim 2, wherein the numerical controller is equipped with an uninterruptible power supply system which backs up a power supply of the numerical controller.

4. The apparatus for control in power failure according to claim 2, wherein the machine tool is a gear cutting machine.

5. The apparatus for control in power failure according to claim 2, wherein the machine tool is a gear grinding machine.

6. A method for controlling a machine tool and a workpiece to be machined by the machine tool during a power failure, comprising the steps of:

connecting an AC power line to a power regeneration circuit;

supplying power from said power regeneration circuit to first and second amplifiers to drive a tool drive motor and a workpiece drive motor;

producing a power regeneration function in said power regeneration circuit when decelerating said motors, whereby energy from said motors is returned as regenerative power to said AC power line;

inhibiting said regenerative power from returning to said AC power line in response to a detected power failure;

selectively connecting a discharge resistor unit to said power regeneration circuit and the first and second amplifiers in response to the detected power failure when the regenerative power returned from said motors exceeds a predetermined threshold value; and decelerating the tool drive motor and the workpiece drive motor in synchronization.

7. A method for controlling a machine tool and a workpiece to be machined by the machine tool during a power failure, comprising the steps of:

supplying power from a power source to a tool drive motor, a workpiece drive motor, and a tool feed motor;

returning energy from said tool drive motor and said workpiece drive motor to said power source during deceleration as regenerative power;

inhibiting said regenerative power from returning to the power source in response to a detected power failure;

decelerating the tool drive motor and the workpiece drive motor in synchronization by selectively supplying the regenerative power to the tool feed motor or a discharge resistor according to comparison of the regenerative power with a threshold value.

8. An apparatus for numerically controlling a machine tool and a workpiece to be machined by the machine tool, comprising:

a tool drive motor;

a workpiece motor;

a first amplifier to drive said tool drive motor;

a second amplifier to drive said workpiece drive motor;

a power failure detector to detect failure of an AC power line and output a corresponding power failure signal;

a numerical controller to control said first and second amplifiers to decelerate the tool drive motor and the workpiece drive motor in synchronization and in response to the power failure signal;

a power regeneration circuit, connected to said AC power line and said first and second amplifiers, to return regenerative power produced during deceleration of said tool drive motor and said workpiece drive motor to the AC power line, and to inhibit the return of the regenerative power to the AC power line upon reception of the power failure signal; and a discharge resistor unit connected to said first and second amplifiers and selectively discharging regenerative power to said power regeneration circuit when the regenerative power has exceeded a predetermined threshold and the power failure signal is received.

9. An apparatus for controlling a machine tool and a workpiece to be machined by the machine tool, comprising:

a tool drive motor;

a workpiece motor;

a power failure detector to detect failure of an AC power line;

a numerical controller to control deceleration of the tool drive motor and the workpiece drive motor in synchronization in response to the detected power failure;

a power regeneration circuit, connected to said AC power line, said tool drive motor and said workpiece motor, to return regenerative power produced during deceleration of said tool drive motor and said workpiece drive motor to the AC power line, and to inhibit the return of the regenerative power to the AC power line in response to the detected power failure; and a discharge resistor unit connected to said first and second amplifiers and selectively discharging regenerative power to said power regeneration circuit when the regenerative power has exceeded a predetermined threshold.

10. An apparatus for controlling a machine tool and a workpiece to be machined by the machine tool, comprising:

a controller to synchronously decelerate a tool motor and a workpiece motor in response to power failure in an AC power line;

a regeneration circuit to return regenerative power produced during deceleration of a tool drive motor and a workpiece drive motor to the AC power line, and to inhibit the return of the regenerative power to the AC power line in response to the detected power failure; and a discharge resistor unit connected to said first and second amplifiers and selectively discharging regenerative power to said power regeneration circuit when the regenerative power has exceeded a predetermined threshold.

* * * * *